(12) United States Patent
Oh et al.

(10) Patent No.: US 8,331,690 B2
(45) Date of Patent: Dec. 11, 2012

(54) METHOD FOR CREATING PANORAMA

(75) Inventors: Sang-Wook Oh, Ansan-si (KR); Seong-Taek Hwang, Pyeongtaek-si (KR); Hyun-Soo Kim, Yongin-si (KR); Sang-Ho Kim, Suwon-si (KR); Ho-Seok An, Yongin-si (KR); Mu-Sik Kwon, Seoul (KR); Ji-Hoon Kim, Seoul (KR); Dong-Chang Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 299 days.

(21) Appl. No.: 12/726,762

(22) Filed: Mar. 18, 2010

(65) Prior Publication Data

US 2010/0239174 A1 Sep. 23, 2010

(30) Foreign Application Priority Data

Mar. 18, 2009 (KR) .................. 10-2009-0023110

(51) Int. Cl.
*G06K 9/48* (2006.01)
*G06K 9/36* (2006.01)
*G06K 9/32* (2006.01)

(52) U.S. Cl. .................. 382/199; 382/284; 382/294

(58) Field of Classification Search .................. None
See application file for complete search history.

(56) References Cited

U.S. PATENT DOCUMENTS

| | | | |
|---|---|---|---|
| 6,128,416 A * | 10/2000 | Oura | 382/284 |
| 2001/0005204 A1 * | 6/2001 | Matsumoto et al. | 345/418 |
| 2003/0128975 A1 * | 7/2003 | Shevick | 396/428 |
| 2004/0189849 A1 | 9/2004 | Hofer | |
| 2005/0259873 A1 * | 11/2005 | Sung et al. | 382/195 |
| 2008/0074506 A1 * | 3/2008 | Oh et al. | 348/218.1 |
| 2009/0052617 A1 * | 2/2009 | Sadakane et al. | 378/38 |
| 2010/0014780 A1 * | 1/2010 | Kalayeh | 382/284 |
| 2010/0246755 A1 * | 9/2010 | Suzuki et al. | 378/11 |

* cited by examiner

*Primary Examiner* — Barry Drennan
*Assistant Examiner* — Andrew Moyer
(74) *Attorney, Agent, or Firm* — The Farrell Law Firm, P.C.

(57) ABSTRACT

A method is provided for creating a panorama. The method includes photographing a plurality of images having same backgrounds and different forms of a subject, determining a size and a position of a reference region for creating a panorama using the images, extracting a target region within the reference region from each of the images, detecting same portions in adjacent target regions, and creating a panorama by combining the adjacent target regions on the basis of the same portions.

6 Claims, 3 Drawing Sheets

METHOD FOR CREATING PANORAMA

PRIORITY

This application claims priority under 35 U.S.C. §119(a) to a Korean Patent Application filed in the Korean Intellectual Property Office on Mar. 18, 2009 and assigned Serial No. 10-2009-0023110, the contents of which are incorporated herein by reference.

BACKGROUND OF THE INVENTION

1. Field of the Invention

The present invention relates generally to a method for creating a panoramic image, and more particularly, to a method for creating a panoramic image from multiple images obtained by photographing various portions of a subject that is smaller than, or falls within, a photographing range of a camera.

2. Description of the Related Art

A digital camera is a photographing device having an image sensor which converts an image of a subject that a user desires to photograph into electrical data and stores the electrical data. The photographing device is used for a variety of devices including a digital camera and a portable communication terminal. The digital camera can take a panoramic image, if it has a built-in program for creating a panoramic image, by converting an image of a subject into electrical data. Therefore, many recently developed digital cameras have been made to support various panoramic images.

The panoramic image refers to an image that has a higher aspect ratio than a normal aspect ratio of a camera, i.e., has a width much larger than its height. The panoramic image is used to photograph an object or target, such as landscape including a mountain and a sea, which is greater than a view angle of a camera, or to simultaneously express several sides of a moving or stationary target in one image.

The panoramic image may be composed using a plurality of continuously taken still images, or using multiple frames constituting a moving image. Separate panorama creation programs may be used to make a panoramic image using continuously taken images.

A method for creating a panoramic image includes assigning sequence numbers such as 1~k, to continuously taken images of a predetermined size (w×h), extracting a region of a predetermined size (m×h; m<w) from the right side of a reference image (i.e., an i-th image, where $1 \leq i < k$) to create an image R(i), extracting a region of a predetermined size (n×h; n<w) from the left side of the next image ((i+1)-th image) to create an image L(i+1), determining the same regions in the image R(i) and the image L(i+1), combining the i-th image with the (i+1)-th image on the basis of a portion found as the same regions, and repeatedly applying this process to a $1^{st}$ image to a (k−1)-th image.

The above-described method for creating a panoramic image creates a panorama using still images, while a method for creating a panoramic image from a moving image continuously connects particular regions such as central potions of respective frames. This method includes assigning sequence numbers, such as 1~k, to continuous frames of a predetermined size (w×h), extracting a region of a predetermined size (m×h; m<w) from the center of a reference frame (i.e., an i-th frame, where $1 \leq i < k$) to create an image M(i), extracting a region of a predetermined size (m×h; m<w) from the center of the next frame ((i+1)-th frame) to create an image M(i+1), combining the image M(i) with the image M(i+1), and applying this process to a $1^{st}$ frame to a (k−1)-th frame.

A conventional method for creating a panoramic image selects one image from among a plurality of taken images, compares the one image with another image located in front of or behind the one image to determine same regions, and synthesizes the images. This method is based on the assumption of continuously photographing images one by one by moving a camera. The above-described method of creating a panoramic image of the entire image by photographing the entire image is possible when creating a panoramic image for a target or subject greater than a camera's view angle, but may not be easily applied when creating a panoramic image for a target smaller than the camera's view angle. The method for creating a panoramic image from a moving image also has the same problem as the method for creating a panoramic image from still images.

That is, conventional panoramic image creation methods may not be easily applied to a subject smaller than a view angle of a photographing means.

SUMMARY OF THE INVENTION

An aspect of the present invention is to address at least the above-mentioned problems and/or disadvantages and to provide at least the advantages described below. Accordingly, an aspect of the present invention provides a method for creating a panoramic image from a subject smaller than a view angle of a photographing means.

Another aspect of the present invention provides a method for creating a panoramic image consisting of various portions of a moving or stationary subject.

A further aspect of the present invention provides a method for creating a panoramic image from images obtained by photographing a subject in various different angles.

In accordance with the present invention, a method for creating a panorama includes photographing a plurality of images having same backgrounds and different forms of a subject, determining a size and a position of a reference region for creating a panorama using the images, extracting a target region within the reference region from each of the images, detecting same portions in adjacent target regions, and creating a panorama by combining the adjacent target regions on the bases of the same portions.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EMBODIMENTS OF THE INVENTION

The following description with reference to the accompanying drawings is provided to assist in a comprehensive understanding of embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for the sake of clarity and conciseness.

The present invention provides a method for selecting a reference region for panorama creation from multiple images, calculating a position and a size of the selected reference region, extracting, from the multiple images, target regions within the reference region, calculating the same common portions between the extracted target regions, and creating a panoramic image by connecting the target regions on the basis of the calculated same portions.

Figure 1:
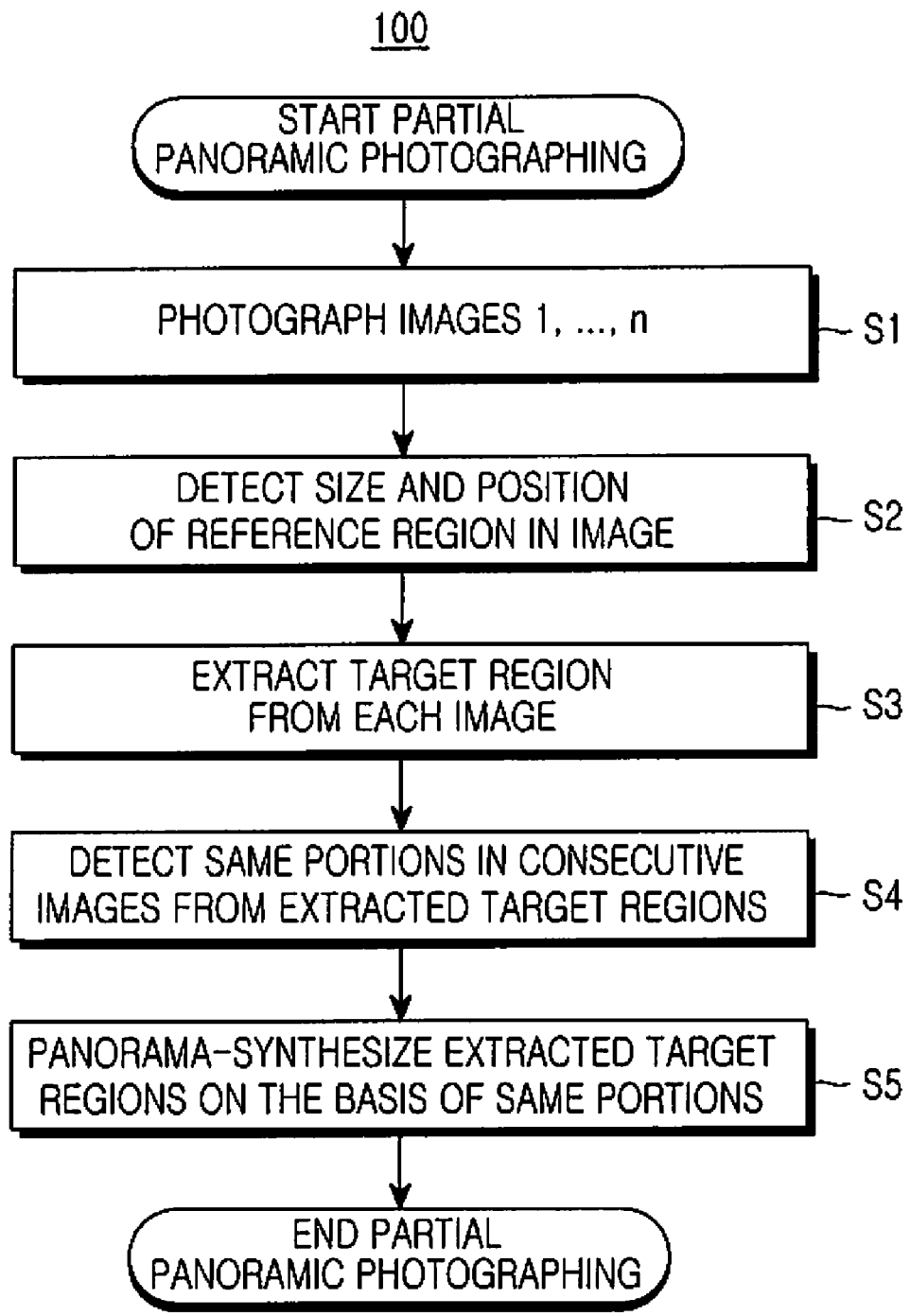
FIG. 1 illustrates a method for creating a panorama according to the present invention.

FIG. 1 illustrates a method for creating a panorama according to the present invention, in which a panoramic image for a target (or subject) smaller than a view angle (region) of a photographing means is created using multiple images. The panorama creation method photographs a subject by moving the subject, with a camera fixed, and creates a panoramic image using images obtained by the photographing.

Therefore, as shown in FIGS. 3A to 3D, the taken images are different forms or sides of the subject, but have the same backgrounds. That is, the pictures shown in FIGS. 3A to 3D are images taken in several different angles while rotating a subject, and are examples of extracted target regions. Thereafter, size and position information of a reference region is calculated using difference images between the taken images. A target region in each image is extracted by applying the target regions to their associated images. The same portions in adjacent images among the extracted target regions are detected, and relative positions of respective target regions are selected and synthesized in a panoramic image on the basis of the same portions. In sum, the present invention photographs multiple consecutive images while moving a subject, with a photographing means fixed, determines a region for creating a panoramic image in each of the photographed images, detects same portions in target regions in adjacent images among the determined target regions, and creates a panoramic image by combining the target regions on the basis of the same portions.

The panorama creation method according to the present invention includes step S1 of photographing a plurality of images having same backgrounds and different forms of a subject by continuously photographing a subject, a panorama of which is to be created, while moving the subject, step S2 of determining a size and a position of a reference region for creating a panorama using the images photographed in step S1, step S3 of extracting, from each of the images, a target region within the reference region, step S4 of detecting same portions in adjacent target regions among the extracted target regions, and step S5 of creating a panorama by combining the adjacent target regions on the basis of the same portions.

Figure 2:
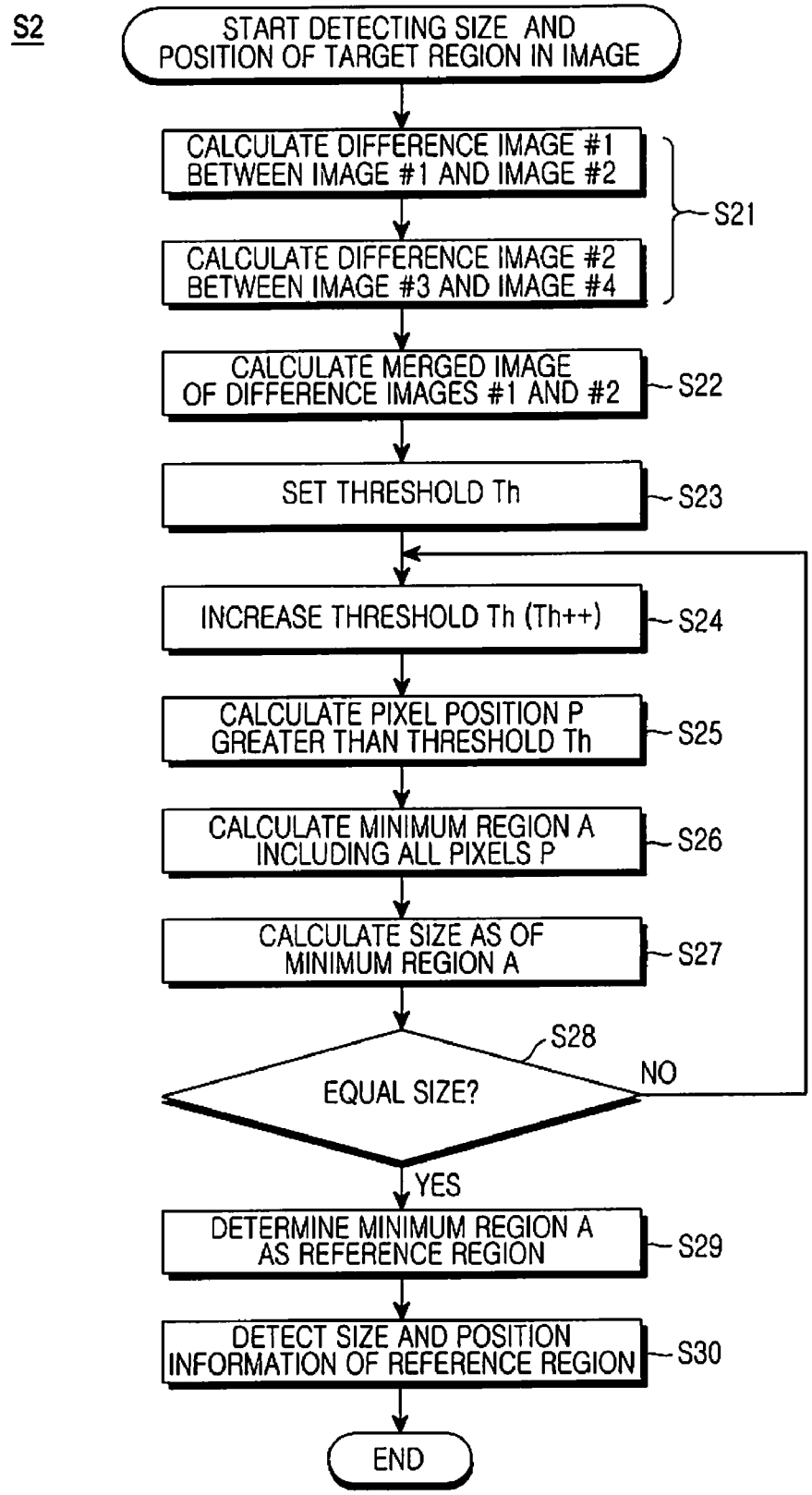
FIG. 2 illustrates the process of calculating a size and a position of a target region, shown in FIG. 1.
Figures 3A, 3B, 3C, 3D:
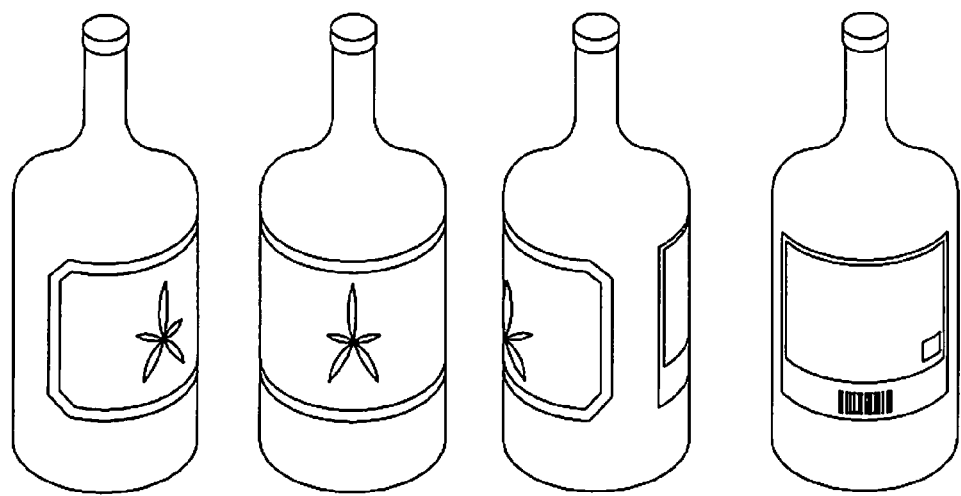
FIGS. 3A to 3D are diagrams of a method for creating a panorama according to an embodiment of the present invention.

FIG. 2 illustrates the process S2 of calculating a size and a position of a reference region, shown in FIG. 1, in which a size and a position of a reference region to be applied to each of multiple images are calculated. The process of FIG. 2 will be described with reference to FIGS. 3A to 3D in which four images are considered, but the number of images is subject to change. A first difference image between first and second images, and a second difference image between third and fourth images are calculated in taken order. The first and second difference images are obtained by calculating pixel differences between adjacent images. A merged image is calculated from the first and second difference images. The merged image is obtained by adding pixel values of the two difference images. The merged image between the difference images undergoes the following process to determine a reference region.

Step S2 includes step S21 of calculating at least one difference image having a difference between adjacent images, step S22 of calculating a merged image between the difference images, step S23 of setting a minimum threshold Th of pixels constituting the merged image, step S24 (Th++) of increasing the minimum threshold Th, step S25 of determining a pixel position P greater than or equal to the threshold Th among the pixels constituting the merged image, step S26 of calculating a minimum region A including all or some pixels of the merged image, step S27 of calculating a size AS of the minimum region A calculated in step S26, step S28 of comparing a size of the minimum region A calculated in step S27 with a size of a minimum region A calculated just before the change in the threshold Th, step S29 of selecting the minimum region A as a reference region if the sizes of the minimum regions A are equal (YES) in step S28, and step S30 of calculating size and position information of the reference region. If the sizes of the minimum regions A are different (NO) in step S28, steps S24 to S27 are repeated.

In more detail, in step S23, the initial minimum threshold Th of pixels constituting the merged image may be set to the minimum value among the pixels values constituting the merged image. For example, if possible pixel values of a difference image are 1-255, the minimum threshold is set to 1.

Step S24 is provided to increase the threshold, and step S25 is provided to determine the pixel position P greater than the threshold among pixels constituting the merged image. As to the determination in step S25, if a pixel having a value greater than the threshold in the merged image is set as 1 and a pixel having a value less than the threshold is set as 0, then the pixel P having a value of 1 may be selected in step S25.

Step S26 is provided to select the minimum region A including all pixels P of the merged image. Step S27 is provided to calculate a size of the minimum region A obtained in step S26, and step S28 is provided to compare a size AS of the minimum region A obtained in step S27 with a size of previous minimum region calculated just before the change in the threshold. If the size of the current minimum region and the size of the previous minimum region are equal (YES), the minimum region may be determined as a desired reference region in step S29. Conversely, if the sizes of the minimum regions are different according to the threshold, the minimum region may not be selected as a reference region. In this case (NO in step S28), steps S24 to S27 are repeated.

If the minimum region is a reference region, its size may be maintained despite the change in the threshold. The above process is applied to images taken to create a panorama, and the target regions within the reference region extracted from respective images are used for panorama creation on the basis of the same common portions between the extracted target regions.

One example for creating the panoramic image by combining the target regions on the basis of the same portions includes assigning sequence numbers such as 1~k, to the target regions of a predetermined size (w×h), extracting a region of a predetermined size (m×h; m<w) from the right side of an i-th target region (where $1 \leq i < k$) to create an image R(i), extracting a region of a predetermined size (n×h; n<w) from the left side of the next target region (i.e., (i+1)-th target region) to create an image L(i+1), determining the same regions in the image R(i) and the image L(i+1), combining the i-th image with the (i+1)-th image on the basis of a portion found as the same regions, and repeatedly applying this process to a $1^{st}$ target region to a (k−1)-th target region. For example, the whole image R(i) may be combined with the remaining portion of the image L(i+1) except for the same region.

Another example for creating the panoramic image by combining the target regions on the basis of the same portions includes assigning sequence numbers, such as 1~k, to the target regions of a predetermined size (w×h), extracting a region of a predetermined size (m×h; m<w) from the center of an i-th target region (where $1 \leq i < k$) to create an image M(i), extracting a region of a predetermined size (m×h; m<w) from the center of the next target region (i.e., (i+1)-th target region) to create an image M(i+1), combining the image M(i) with the image M(i+1), and applying this process to a $1^{st}$ target region to a (k−1)-th target region.

As is apparent from the foregoing description, the present invention provides a panorama creation method for simultaneously expressing several sides of a subject in one image when photographing a moving image or photographing a plurality of images while moving the subject regarding a subject smaller than a view angle of a photographing means. That is, the panorama creation method according to the present invention creates a panorama of a subject greater than a view angle of a photographing means by creating a panorama from a plurality of images taken while moving a subject, a panorama of which is to be taken, with the photographing means fixed.

A conventional panorama creation method takes the entire image of a large subject exceeding a photographing range of a camera, using pictures obtained by photographing a subject of landscape such as a mountain. In contrast, the present invention creates one panoramic image consisting of various partial images of a small subject (a subject falling within a view angle or a photographing range of a camera) having various sides or various cubic effects.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for creating a panorama, comprising:
    (a) photographing a plurality of images, each image having a different orientation of a same subject with respect to a same background;
    (b) determining, with respect to each image, a size and a position of a reference region including the subject for creating a panorama of the subject using the images photographed in step (a);
    (c) extracting a target region within the reference region from each of the images;
    (d) detecting same portions in adjacent target regions;
    (e) creating the panorama of the subject by combining the adjacent target regions on the basis of the same portions; and
    wherein step (b) further comprises:
    (f) calculating at least two difference images having a difference between adjacent images;
    (g) calculating a merged image between the difference images;
    (h) setting a minimum threshold of pixels constituting the merged image;
    (i) increasing the minimum threshold;
    (j) determining a pixel position greater than the threshold among the pixels constituting the merged image; and
    (k) calculating a minimum region including all pixels of the merged image values of which are greater than the minimum threshold.

2. The method of claim 1, wherein step (b) further comprises:
    (l) calculating a size of the minimum region calculated in step (k);
    (m) comparing the size of the minimum region calculated in step (l) with a size of a previous minimum region calculated before the change in the threshold; and
    (n) selecting the minimum region as a reference region if the sizes of the minimum regions are equal in step (m).

3. The method of claim 2, wherein step (b) further comprises:
    (o) detecting size and position information of the reference region.

4. The method of claim 2, further comprising:
    (p) repeating steps (i) to (l) if the sizes of the minimum regions are different in step (m).

5. The method of claim 1, wherein the difference image is obtained by calculating pixel differences between adjacent images among the images for panorama creation.

6. The method of claim 5, wherein the merged image is obtained by adding pixel values of two or more difference images.

* * * * *